US012655952B2

(12) United States Patent
Jones et al.

(10) Patent No.: US 12,655,952 B2
(45) Date of Patent: Jun. 16, 2026

(54) FLUSH GLASS ADJUSTABLE LIGHTING FIXTURE

(71) Applicant: USAI, LLC, New Windsor, NY (US)

(72) Inventors: Jonathan I. Jones, Highland, NY (US); Robert Leiter, New York, NY (US); Frank Cogliano, Pomona, NY (US); Yi Yang, New Windsor, NY (US)

(73) Assignee: USAI, LLC, New Windsor, NY (US)

( * ) Notice: Subject to any disclaimer, the term of this patent is extended or adjusted under 35 U.S.C. 154(b) by 0 days.

(21) Appl. No.: 18/183,756

(22) Filed: Mar. 14, 2023

(65) Prior Publication Data

US 2023/0288037 A1 Sep. 14, 2023

Related U.S. Application Data

(60) Provisional application No. 63/319,708, filed on Mar. 14, 2022.

(51) Int. Cl.

| | |
|---|---|
| ***F21S 8/02*** | (2006.01) |
| ***F21V 15/01*** | (2006.01) |
| ***F21V 21/04*** | (2006.01) |
| ***F21V 21/34*** | (2006.01) |
| ***F21V 29/70*** | (2015.01) |
| ***F21V 31/00*** | (2006.01) |

(52) U.S. Cl.

CPC ............ *F21S 8/026* (2013.01); *F21V 15/012* (2013.01); *F21V 21/047* (2013.01); *F21V 21/34* (2013.01); *F21V 29/70* (2015.01); *F21V 31/005* (2013.01)

(58) Field of Classification Search

CPC .............................. F21S 8/026; F21V 21/047

See application file for complete search history.

(56) References Cited

U.S. PATENT DOCUMENTS 2,282,079 A * 5/1942 Morehead .............. G09F 13/16 40/619
3,562,513 A * 2/1971 Jaffe .................... F21V 17/162 362/305
4,164,011 A * 8/1979 Sherwood ................ F21S 8/02 362/330

(Continued)

FOREIGN PATENT DOCUMENTS

CA 2228534 A1 * 8/1999 ............. F21S 8/026
CN 2223414 Y * 3/1996

(Continued)

*Primary Examiner* — Fatima N Farokhrooz

(74) *Attorney, Agent, or Firm* — Farber LLC; Fritz L. Schweitzer, III

(57) ABSTRACT

A recessed light fixture has an enclosure with an aperture, a light source operable to emit light through the aperture, and a glass element operable to transmit light emitted from the light source into the room. The glass element is disposed substantially planar with a bottom surface of the ceiling and has a beveled outer edge having an opaque coating operable to substantially prevent light from exiting through the bevel. A cover assembly is adapted to close an opening of a plaster frame, and has a cover plate and an elastomeric seal which forms a contiguous seal against a bottom of an interior of a liner of the plaster frame. A position of the light engine being adjustable relative to an aperture into a downlight position, wall wash position and service position.

14 Claims, 20 Drawing Sheets

(56) References Cited

U.S. PATENT DOCUMENTS

| | | | | |
|---|---|---|---|---|
| 7,832,889 | B1 * | 11/2010 | Cogliano | F21S 8/02 362/147 |
| 9,089,726 | B1 * | 7/2015 | Luo | E04B 1/948 |
| 9,243,786 | B1 * | 1/2016 | Onda | F21V 21/14 |
| 10,767,849 | B2 * | 9/2020 | Cattoni | F21V 29/76 |
| 11,428,398 | B1 * | 8/2022 | Portinga | F21V 29/74 |
| 2009/0175040 | A1 * | 7/2009 | Green | F21S 8/02 362/294 |
| 2009/0290360 | A1 * | 11/2009 | Wilcox | F21S 8/02 362/327 |
| 2013/0056781 | A1 * | 3/2013 | Suenaga | H01L 33/58 257/E33.061 |
| 2014/0307445 | A1 * | 10/2014 | Highbridge | F21V 21/042 362/404 |
| 2015/0131296 | A1 * | 5/2015 | O'Brien-Bernini | F21V 31/005 362/310 |
| 2017/0184285 | A1 * | 6/2017 | Visser | F21V 23/008 |
| 2020/0116340 | A1 * | 4/2020 | Nikooyan | F21V 21/04 |
| 2020/0264364 | A1 * | 8/2020 | Sieberth | G02B 6/0073 |
| 2020/0340637 | A1 * | 10/2020 | Yeo | F21V 23/04 |

FOREIGN PATENT DOCUMENTS

| | | | | | |
|---|---|---|---|---|---|
| CN | 201190924 | Y | * | 2/2009 | |
| CN | 206754966 | U | * | 12/2017 | |
| CN | 206786498 | U | * | 12/2017 | |
| CN | 213237111 | U | * | 5/2021 | |
| EP | 1278008 | A2 | * | 1/2003 | F21S 8/02 |
| EP | 2811226 | A1 | * | 12/2014 | F21S 4/28 |
| EP | 3309450 | A1 | * | 4/2018 | F21V 7/048 |
| JP | 2011086621 | A | * | 4/2011 | F21S 8/02 |
| JP | 2018166026 | A | * | 10/2018 | |
| KR | 101642288 | B1 | * | 7/2016 | |
| WO | WO-2008078081 | A1 | * | 7/2008 | F21V 25/125 |
| WO | WO-2009133199 | A2 | * | 11/2009 | F21S 8/024 |

* cited by examiner

SECTION C-C

DETAIL D

FLUSH GLASS ADJUSTABLE LIGHTING FIXTURE

FIELD OF THE INVENTION

The invention pertains to lighting, and in particular recessed lighting fixtures.

BACKGROUND OF THE INVENTION

Recessed lighting fixtures have been a popular lighting solution for many years, offering a sleek and minimalistic look that blends seamlessly into a variety of interior designs. Traditionally, these fixtures were designed solely for functional purposes, providing general illumination for a room without attracting attention to themselves. However, with the rise of interior design as a prominent aspect of home improvement, the desire for aesthetically pleasing recessed lighting fixtures has increased.

Furthermore, with the advent of LED technology, recessed lighting fixtures have become increasingly versatile, allowing for a range of configurations and lighting effects. In particular, the ability to adjust between a downlight configuration and a wall wash configuration has become highly desirable, as it allows for a variety of lighting effects to be achieved with a single fixture.

Additionally, serviceability has become an important aspect of recessed lighting fixture design. In the past, accessing the electrical components of a recessed lighting fixture required removing the entire fixture from the ceiling, which was time-consuming and often required professional assistance. However, with the desire for more accessible serviceability, it is desirable for lighting fixtures to have easily replaceable components that can be accessed from within the room.

Overall, the combination of aesthetic appeal, adjustability, and easy serviceability makes this invention highly desirable for both residential and commercial lighting applications.

Therefore, what is desired is an aesthetically pleasing recessed lighting fixtures which will enhance the overall look of a room, complementing its design elements rather than detracting from them, the ability to adjust between a downlight configuration and a wall wash configuration to allow for a range of lighting, and easy serviceability from within the room to allow for quick and hassle-free maintenance of the lighting fixture.

SUMMARY OF THE INVENTION

The invention comprises a recessed light fixture operable to emit light through an opening in a ceiling into a room below the ceiling. The light fixture can include a full or partial enclosure, an aperture in the enclosure, a light source operable to emit light through the aperture, and a glass element operable to transmit light emitted from the light source into the room. The glass element is preferably configured to be disposed within the opening in the ceiling and to substantially fully span the opening such that substantially all light emitted into the room from the light source passes through the glass element.

The glass element preferably has a substantially planar bottom surface and the glass element is operable to be fixed relative to the enclosure, with the bottom surface substantially planar with a bottom surface of the ceiling. The glass element has a beveled outer edge extending around a periphery of the glass element, and the bevel being inclined upwardly and outwardly from the bottom surface of the glass element. The bevel preferably has an opaque coating operable to substantially prevent light from exiting through the bevel.

The light fixture can include a plaster frame and a cover assembly having a cover plate and an elastomeric seal. The cover assembly is adapted to close an opening of the plaster frame with the seal abutting an interior wall of the liner and forming a contiguous seal thereagainst, with the seal extending substantially to a bottom of the interior wall of the liner.

BRIEF DESCRIPTION OF THE DRAWINGS

FIGS. 8A and 8B are side views of the brackets.

DETAILED DESCRIPTION OF THE INVENTION

Figure 1:
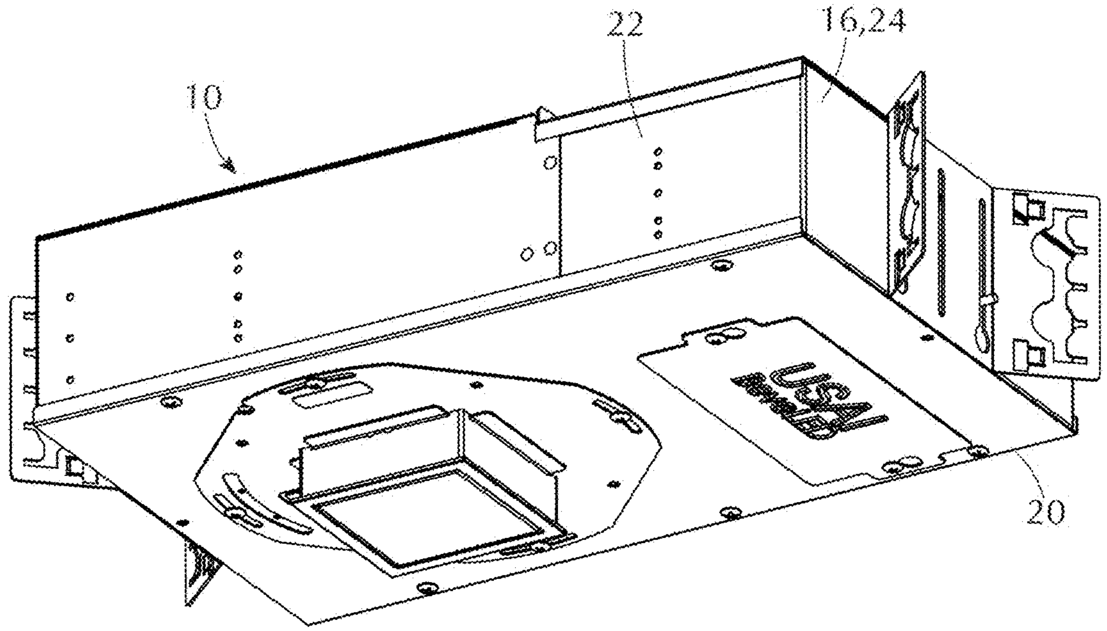
FIG. 1 is perspective view of a first embodiment of a light fixture according to the invention, from below.
Figure 2:
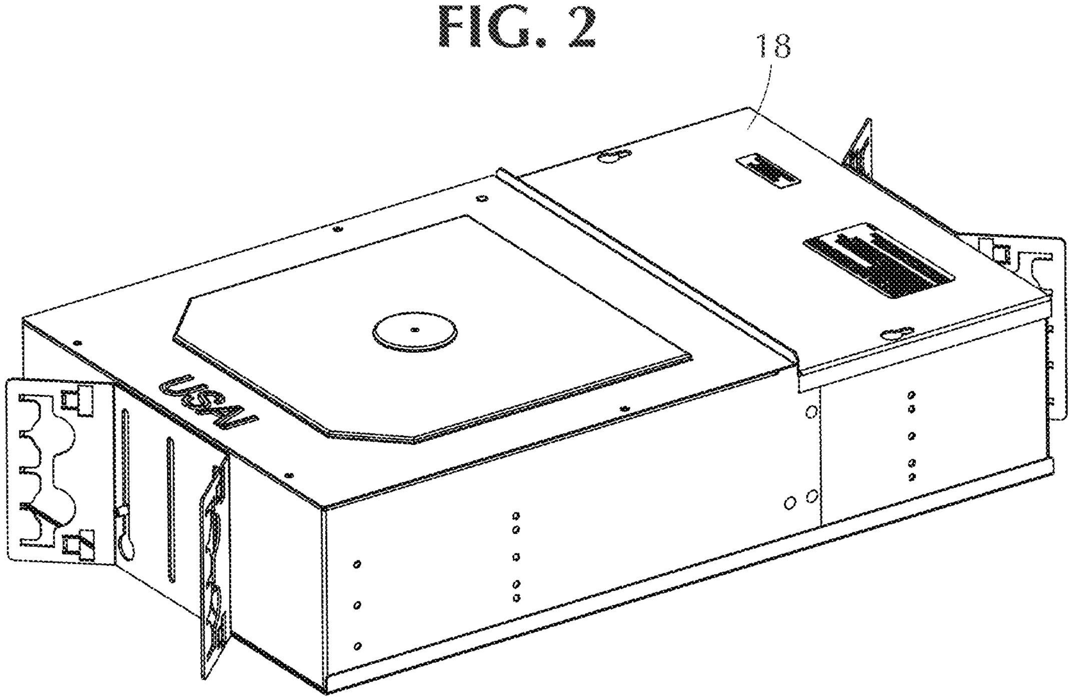
FIG. 2 is a perspective view of the light fixture of FIG. 1, from above.

The lighting fixture 10 is configured as a recessed light fixture which is installed above a ceiling structure 12 and projects light through an opening 14 in the ceiling into a room below. The lighting fixture 10 is described herein as being installed and/or oriented with respect to a horizontal ceiling, which is typical. However, it should be understood that other orientations are possible.

Preferably, the lighting fixture 10 can be configured as a "down light," where a majority of the light is emitted substantially vertically downward, or in a "wall-wash" configuration, where the light is emitted at substantial angle from vertical, and typically toward an adjacent wall or object to be illuminated. In addition, the light fixture 10 is preferably operable to be serviced from the room below, after installation and finishing of the ceiling, for example to install or replace a light-emitting element and/or a lighting driver.

Referring to FIGS. 1-8, a first preferred embodiment of a recessed lighting fixture 10 constructed according to the invention can include a housing 16 having a top wall 18, bottom wall 20, and a number of side walls 22, which can define a full or partial enclosure 24. The lighting fixture 10 preferably also includes a heat sink 26, a lighting element 28 (such as one or more LEDs), optical element(s) 30, and a trim element 32. The optical element(s) 30 can include one or more reflectors 34, 34' and/or lenses 36, or other optical elements. Preferably, the lighting element 28 and/or the optical element(s) 30 are connected to the heat sink 26.

The bottom wall 20 of the housing 16 includes an aperture 38 which is aligned with the opening 14 in the ceiling 12. The lighting element 28 is positioned above and/or adjacent the aperture 38 and emits light through the aperture 38 into the room below.

Figure 3:
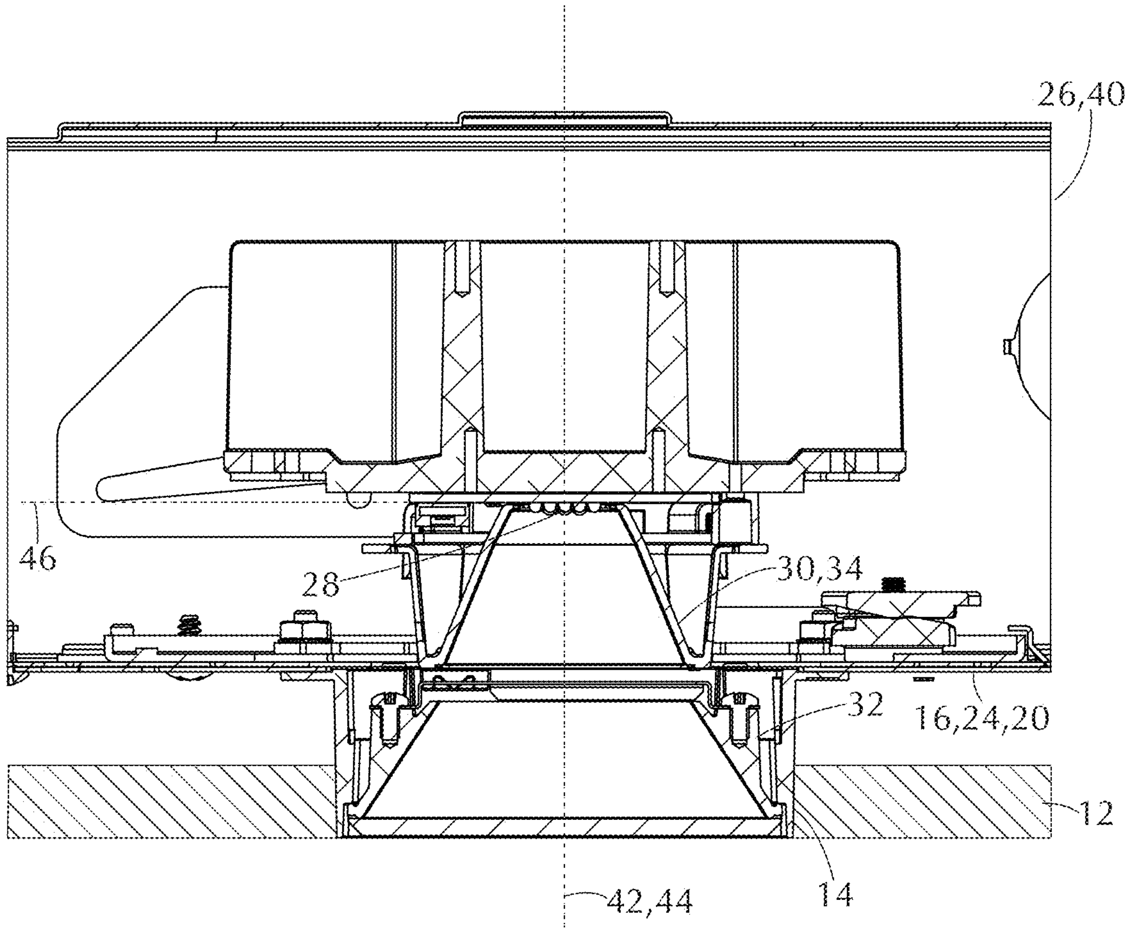
FIG. 3 is partial cross section from the side of the light fixture of FIG. 1 configured as a downlight, showing the light engine assembly in the downlight position.
Figure 4:
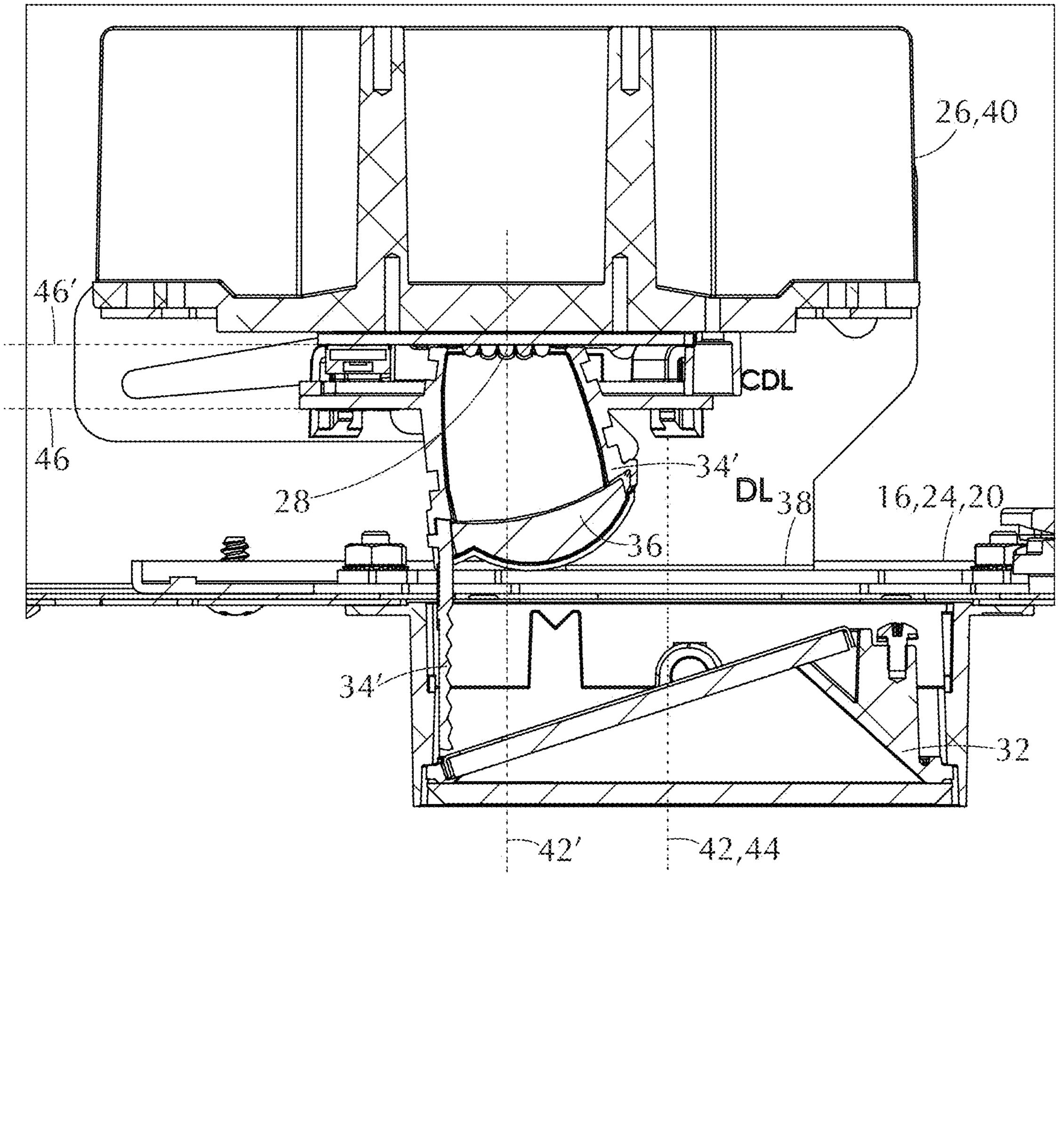
FIG. 4 is partial cross section from the side of the light fixture of FIG. 1 configured as a wall wash light, showing the light engine assembly in the wall wash position.
Figure 5A:
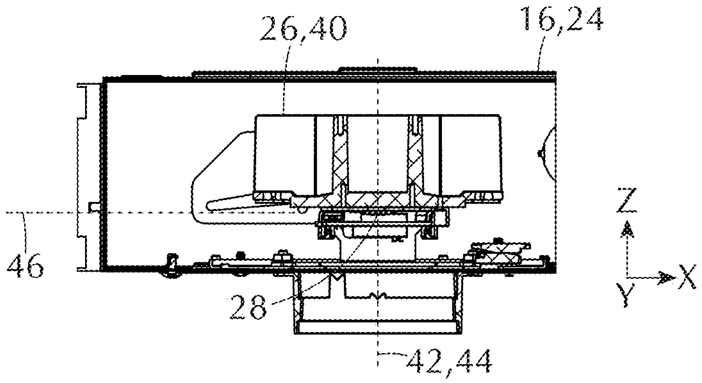
FIG. 5A is cross section from the side of the light fixture of FIG. 1, showing the light engine assembly in the downlight position.
Figure 5B:
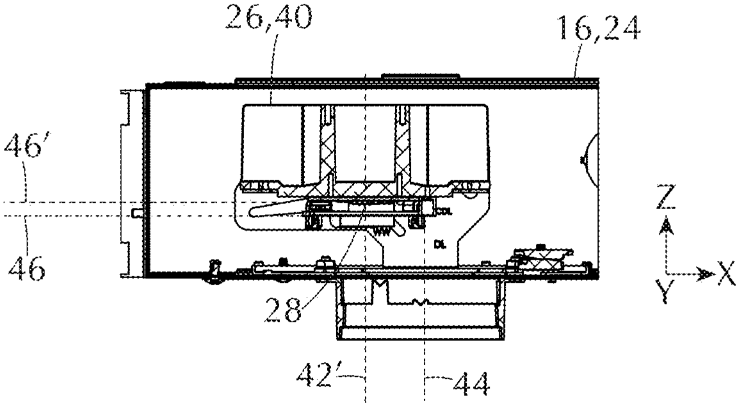
FIG. 5B is cross section from the side of the light fixture of FIG. 1, showing the light engine assembly in the wall wash position.
Figure 6A:
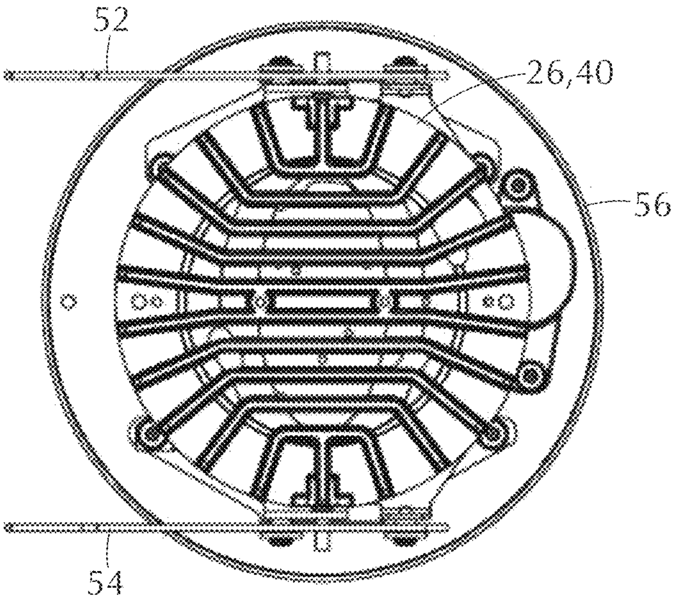
FIG. 6A is plan view, showing the light engine assembly in the downlight position.
Figure 6B:
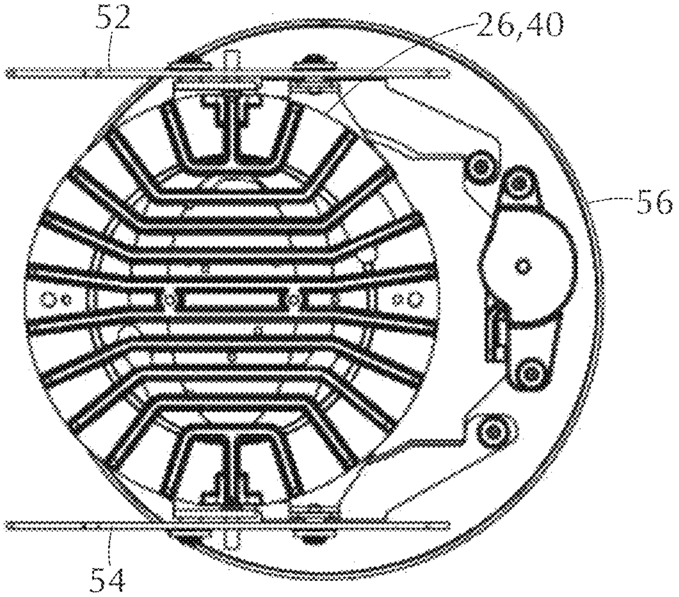
FIG. 6B is plan view, showing the light engine assembly in the wall wash position.

Referring to FIGS. 3, 5A and 6A, a light engine assembly 40 of the lighting fixture 10 includes the heat sink 26 and the lighting element 28, and optionally one or more of the optical elements 30. Preferably, a position of the light engine assembly 40 is adjustable relative to the housing. The lighting fixture 10 preferably has a "downlight" configuration wherein the light engine assembly 40 can be disposed above the aperture 38, and the lighting element 28 is disposed at a (first) vertical height 46 relative to the bottom wall 20 of the housing 16. In this position, an optical axis 42 of the lighting element 28 can be substantially vertical (e.g., parallel to Z-axis) such that it is perpendicular to a plane 48 (X-Y axes) of the aperture 38, and can be aligned or substantially aligned with and/or pass through a center axis 44 of the aperture 38, such that a majority of the light is emitted substantially vertically downward through the aperture 38. In the downlight position, Referring to FIGS. 4, 5B and 6B, the lighting fixture 10 preferably has a "wall wash" configuration wherein the light engine assembly 40 is substantially offset from the downlight position, laterally (e.g., horizontally, X axis) and/or upwardly (e.g., vertically, Z axis). For example, in the wall wash configuration, the optical axis 42' of the lighting element 28 can remain substantially vertical but can be substantially laterally (e.g., horizontally) offset from the center axis 44 of the aperture 38, for example, by about 1-2 inches), and the (second) vertical height 46' of the lighting element 28 can be offset upwardly (e.g., vertically) from the (first) vertical height 46 of the downlight position, for example by about 0.5-1 inches, or preferably about 3/16 to 1/4 in. Preferably, in the wall wash position, neither the light engine assembly 40 nor the lighting element 28 is tilted relative to downlight position about any of the X, Y and/or Z axes.

As shown in FIG. 4, in the wall wash configuration, the lighting fixture 10 can include optical elements 30, such as a reflectors 34' and lens 36 adapted to direct a majority a of the emitted light through the aperture 38 at a substantial angle from vertical to illuminate a wall or other object adjacent the lighting fixture 10.

Figure 5C:
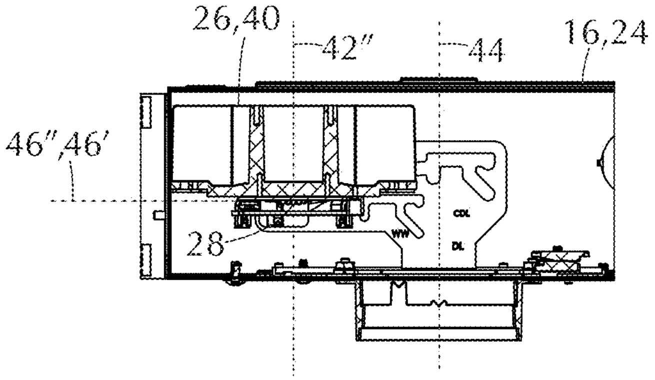
FIG. 5C is cross section from the side of the light fixture of FIG. 1, showing the light engine assembly in the service position.

Referring to FIG. 5C, the lighting fixture 10 preferably also has a service position in which the light engine assembly is further offset from the wall wash position to allow manual access to an interior of the housing 16 for installation or removal (servicing) of a lighting driver (not shown) or other components within the housing. In the service position, the optical axis 42" of the lighting 28 can remain substantially vertical but can be substantially laterally (e.g., horizontally) offset from the optical axis 42' of the wall wash position, further away from the center axis 44 of the aperture 38. For example, in the service position, the optical axis 42" can be offset from the center axis of the aperture by about 2-4 inches. In addition, the (third) vertical height 46" of the lighting element 28 can be substantially offset upwardly (e.g., vertically) from the (first) vertical height 46 of the downlight position, for example by about 0.5-1 inches), and can be the same or substantially the same as the vertical height 46' of the wall wash position.

Figure 7:
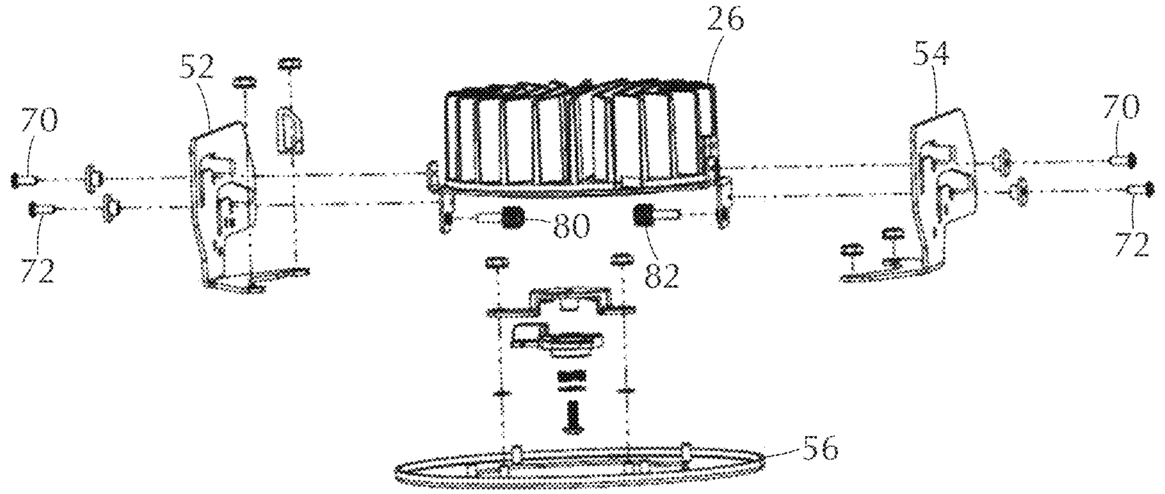
FIG. 7 is a partial exploded view.
Figure 8A:
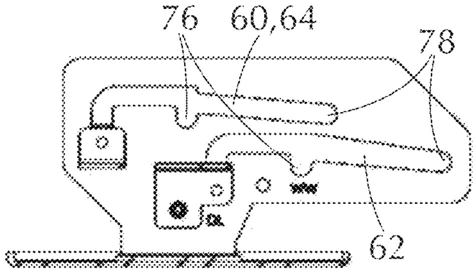
Figure 8A:
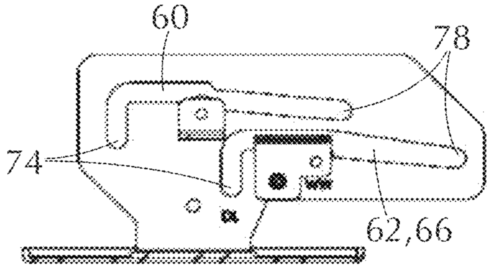

Referring to FIGS. 7, 8A and 8B, the light engine assembly 40 can be mounted between a pair of brackets 52, 54 which are connected to a rotation plate 56. The mounting brackets 52, 54 permit the light engine assembly 40 to move between the several positions described above, including the downlight, wall wash and service positions. The rotation plate 56 is rotationally connected to the housing 16, for example to the bottom wall 20, and permits the light engine assembly 40 to rotate relative to the housing 16 about a vertical (Z) axis to allowing for "aiming" the light emitted from the fixture.

Each bracket 52, 54 includes a pair of guides 60, 62, which can be in the form of upper and lower channels slots 64, 66, as depicted. A first guide 60 is preferably laterally (e.g., X-axis) (and preferably also vertically, e.g., Z-axis) offset from a second guide 62 on each bracket. Pairs of first and second pins 70, 72 are connected to each side of the light engine assembly 40. On each side of the light engine assembly 40, the first pin 70 is laterally (and preferably also vertically) offset from the second pin 72 on the same side, corresponding to the offset of the guides 60, 62. Each pin 70, 72 engages and slides within one of the guides 60, 62.

Each guide 60, 62 preferably includes first, second and third rest positions 74, 76, 78, which correspond to the downlight, wall wash, and service positions of the light engine assembly 40. The first and third rest positions 74, 78 can be at opposite ends (e.g., limits) of each guide 60, 62 and the second rest position can be at an intermediate position of each guide. The second rest position 76 can be laterally and vertically offset from the first rest position 74, corresponding to the aforementioned offset between the downlight and wall wash positions. Likewise, the third rest position can be offset laterally (and optionally vertically) from the second rest position corresponding to the offset(s) between the wall wash and service positions.

Each first and second rest positions 74, 76 can be formed by or include a vertically-downwardly oriented section of the associated guide, requiring a vertical movement of the light engine assembly 40 to move into and out of such positions. The third rest position 78 can be formed by or include an inclined section of the associated guide, requiring an upwardly inclined movement of the light engine assembly 40 to move from the service position to the wall wash and/or down light positions, such that the light engine assembly 40 is biased toward the service position when in the service position or between the wall wash position and the service position.

The lighting fixture 10 can include means to lock the light engine assembly 40 in the various positions, which can include one or more (e.g., a pair) of locking screws 80, 82, which are selectively engageable with an associated bracket 52, 54, to fix the position of the light engine assembly 40 relative to the bracket.

Figure 9:
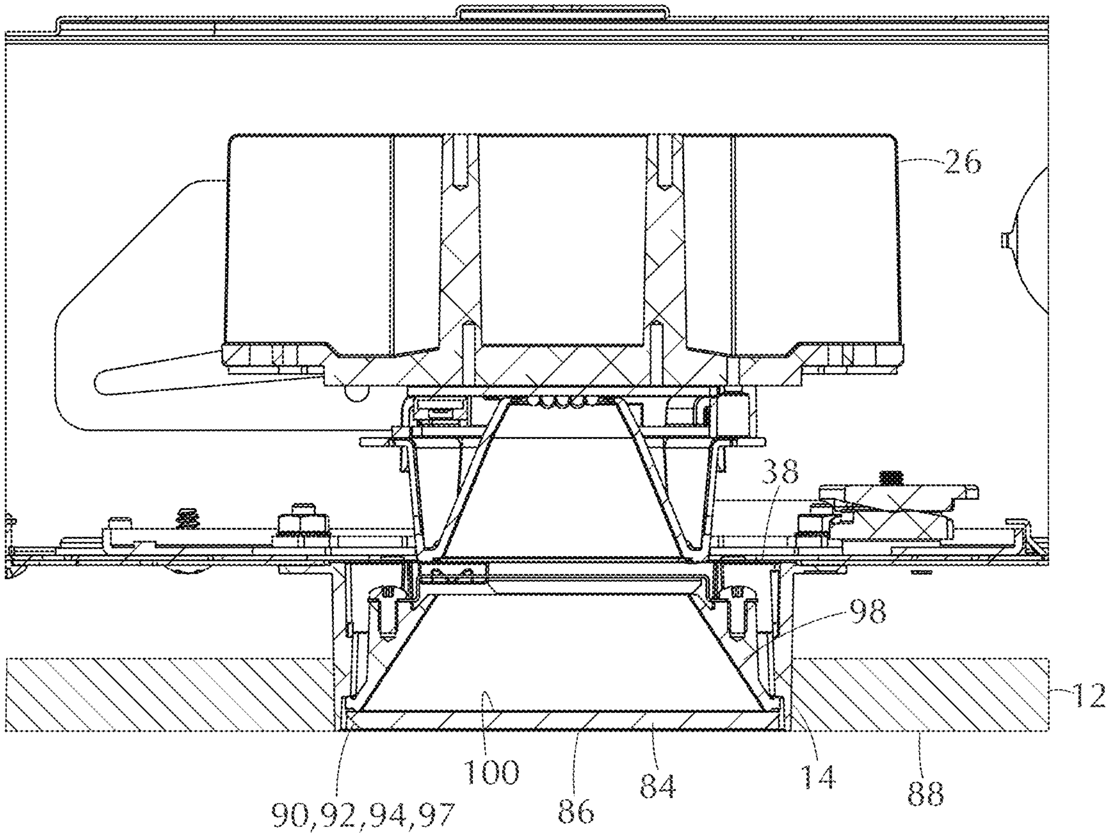
FIG. 9 is partial cross section from the side, showing the glass element.
Figure 10:
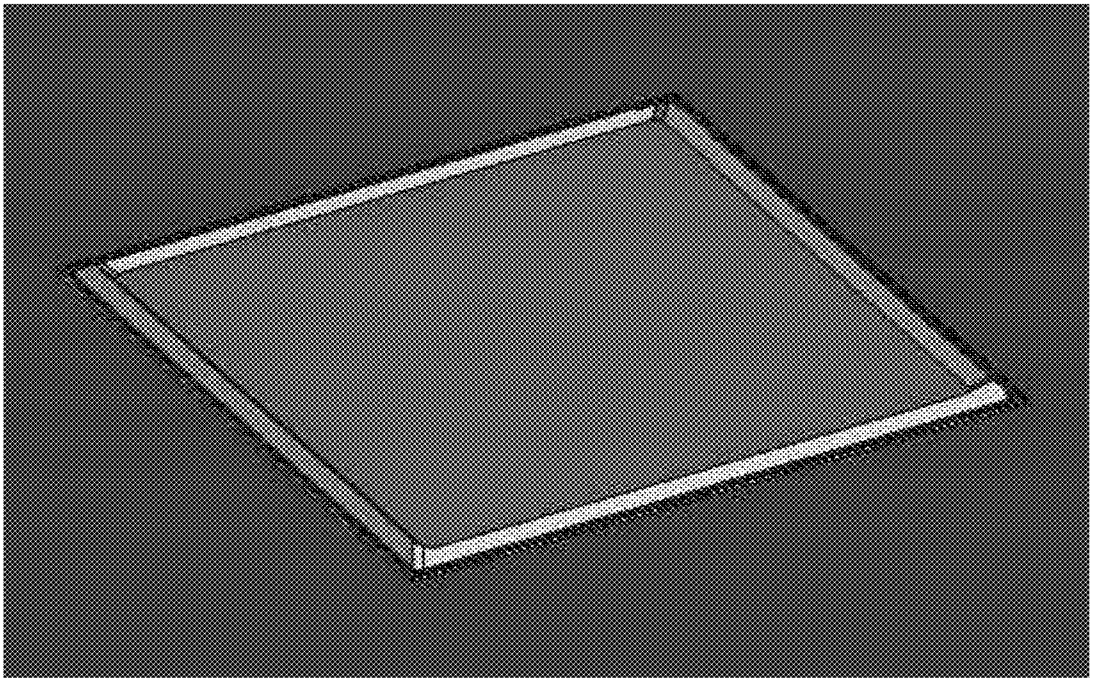
FIG. 10 is a perspective view of an installed, finished light fixture, showing the glass element.
Figure 11:
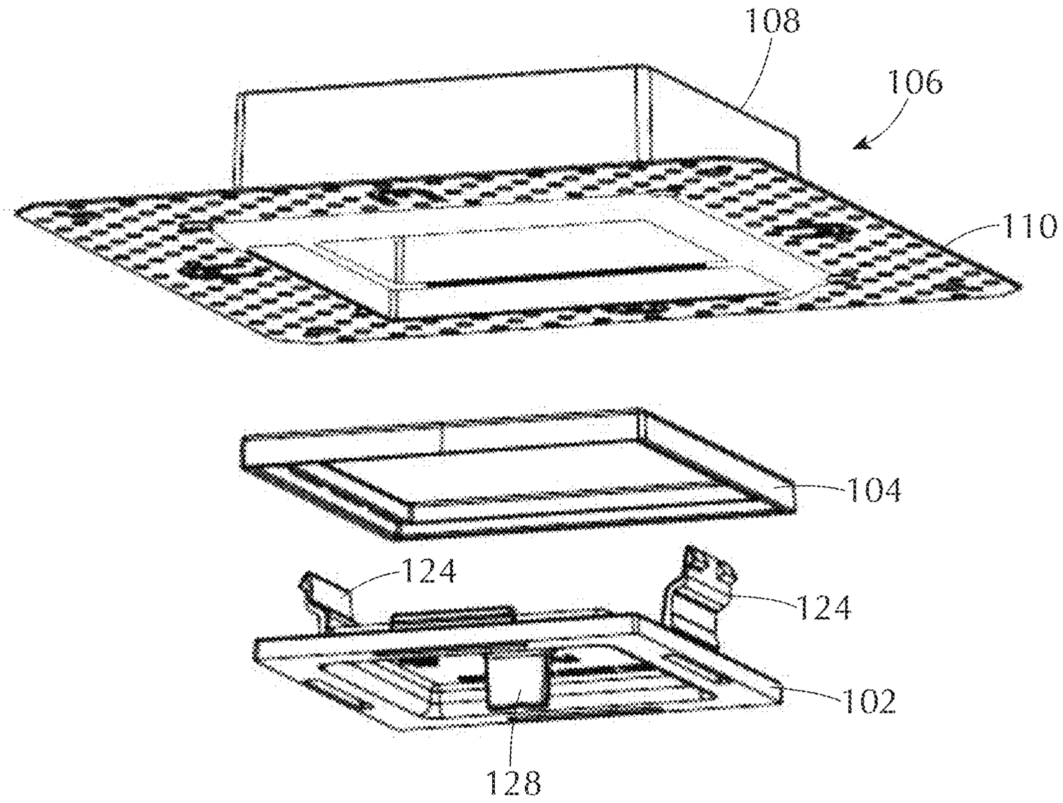
FIG. 11 is a perspective, exploded view of the cover, seal and plaster frame, from below.
Figure 12:
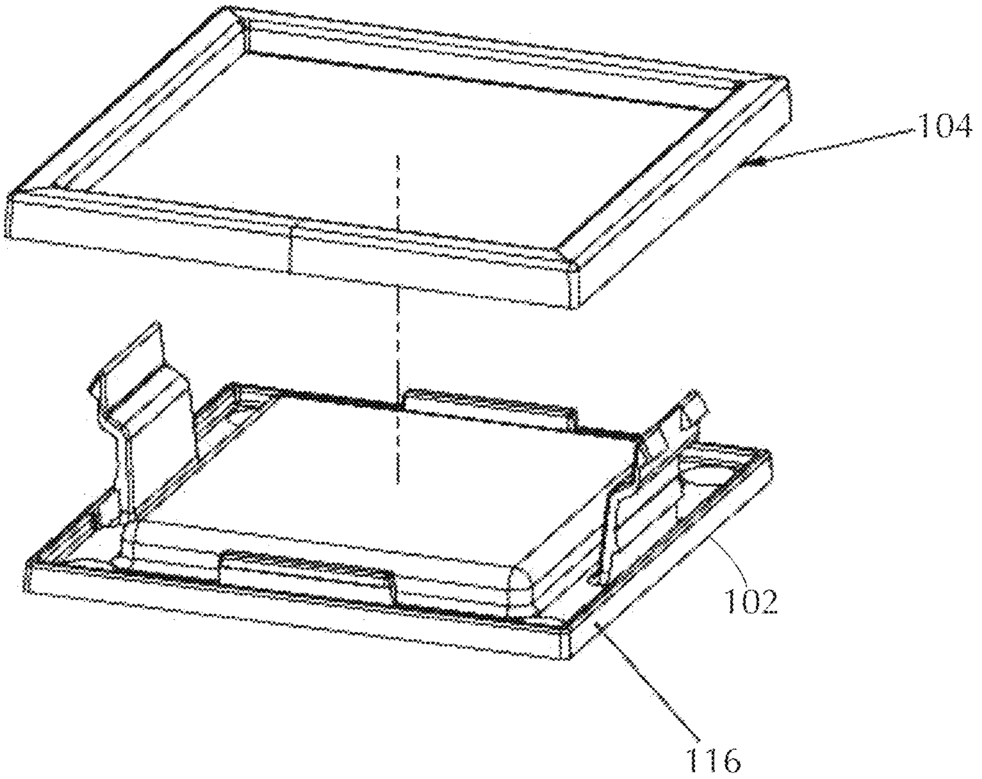
FIG. 12 is a perspective, exploded view of the cover and seal, from above.
Figure 13:
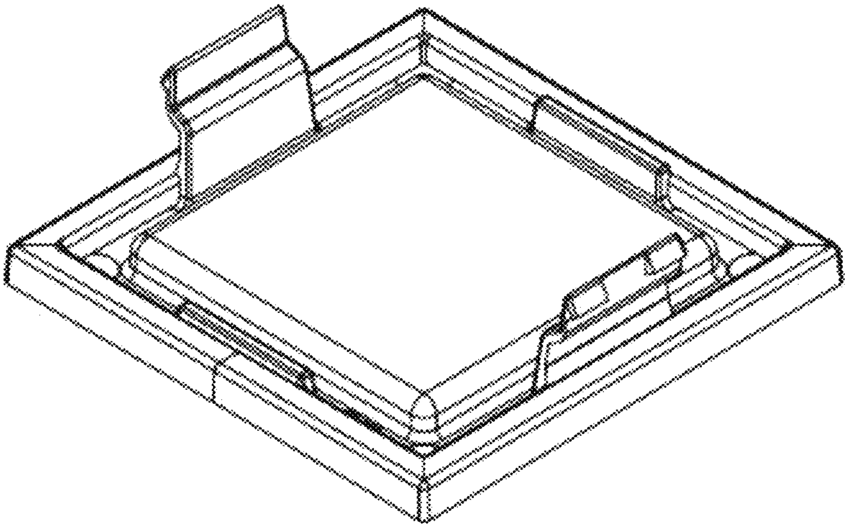
FIG. 13 is a perspective view of the cover and seal assembly, from above.
Figure 14:
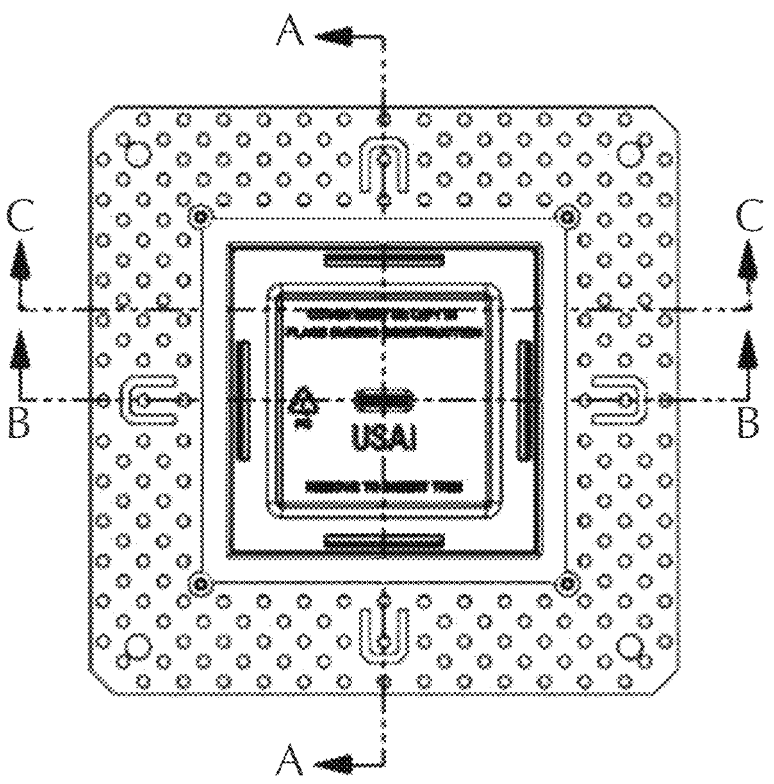
FIG. 14 is a bottom view of an assembly of the cover, seal and plaster frame.
Figure 15:
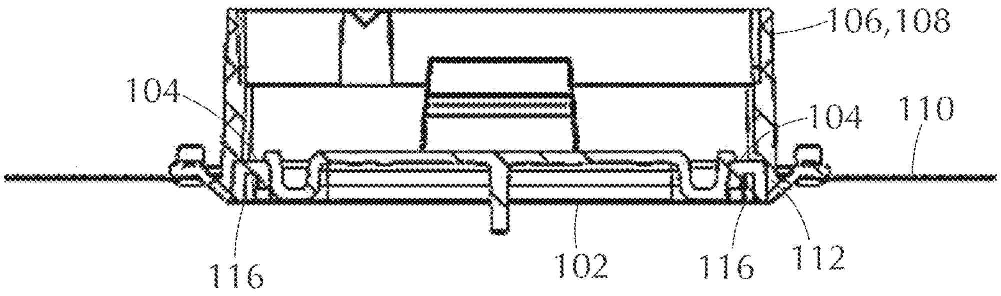
FIG. 15 is a cross-section view, taken along line A-A of FIG. 14.
Figure 16:
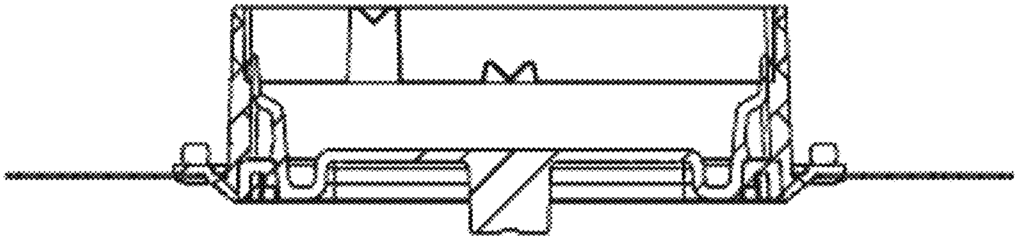
FIG. 16 is a cross-section view, taken along line B-B of FIG. 14.
Figure 17:
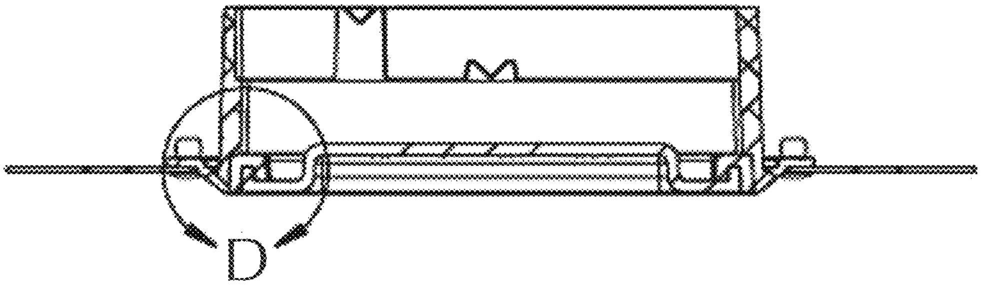
FIG. 17 is a cross-section view, taken along line C-C of FIG. 14.
Figure 18:
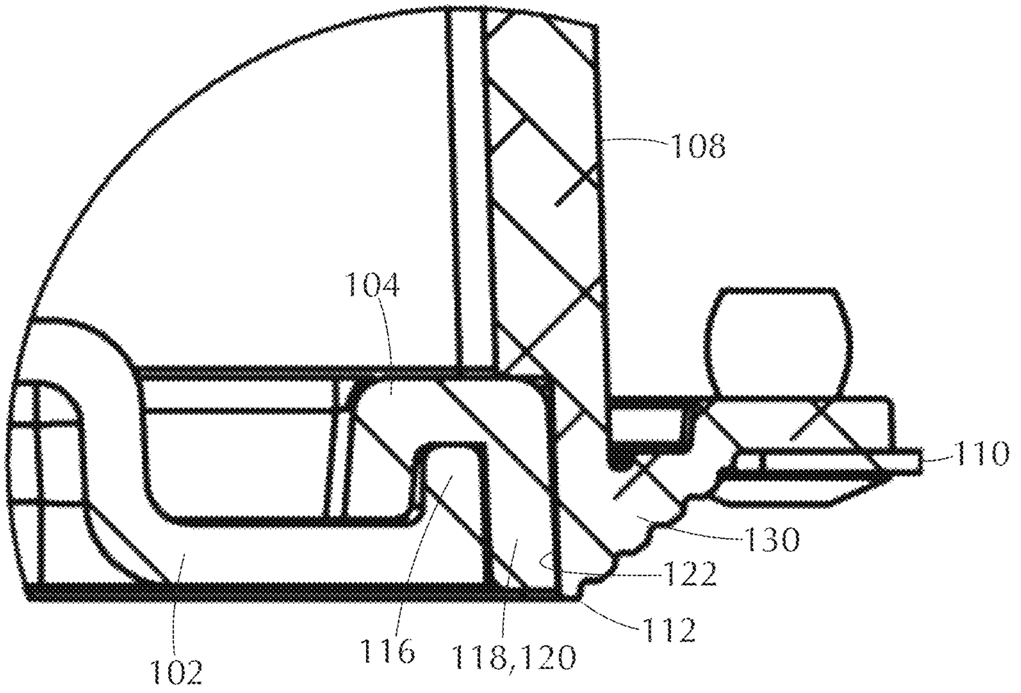
FIG. 18 is a view of detail D of FIG. 14.
Figure 19:
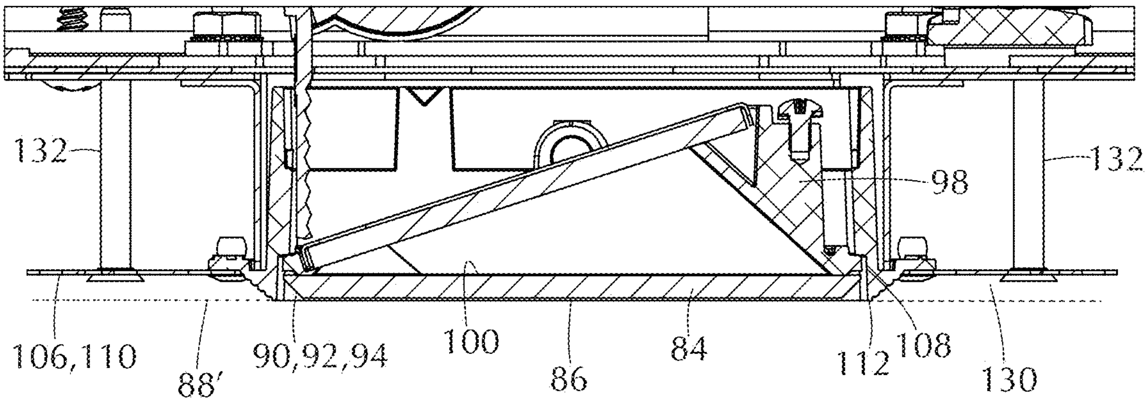
FIG. 19 is a cross-section view, showing the flush glass element.

Referring to FIGS. 9-10 and 19, the lighting fixture 10 can have a light-transmitting glass element 84 which is disposed in the opening of the ceiling below the aperture 38, and is fixed relative to the housing 16 and/or ceiling 12. The glass element 84 is preferably transparent and allows light emitted from the light source to pass into the room. The glass element 84 is preferably configured to substantially fully span the opening such that substantially all light emitted into the room from the light source passes through the glass element; The glass element 84 can be in the form of a substantially planar glass plate, and can be substantially flush with a bottom surface 88 of the ceiling 12 (and/or the finished portion thereof adjacent the lighting fixture), which provides an aesthetically pleasing appearance to the visible portion of the light fixture. For example, a bottom surface 86 of the glass element 84 can be substantially planar and can be substantially parallel to, and co-planar with, the bottom (finished) surface 88 of the ceiling 12. For example, the bottom surface of the glass element can be within +/−0.0-0.25 in, vertically of the bottom surface of the ceiling.

The glass element 84 preferably includes an outer edge 90 extending around a periphery of the glass element 84. The outer edge 90 preferably has a bevel 92 extending upwardly and outwardly from the bottom surface 86, forming an inclined surface 94 extending around the periphery of the glass element 84, which can be substantially flat or planar. The inclined surface 94 can be at an angle of about 40 degrees relative to horizontal (e.g., relative to X-Z plane).

The glass element 84 preferably has a general shape which is complementary to the shape of the opening in the ceiling. For example, where the opening in the ceiling is square as depicted, the glass element 84 can have a generally square shape in which case the outer edge 90 can comprise a plurality of linear segments, and the inclined surfaces thereof can be substantially planar. More specifically, where the opening in the ceiling has a square shape, due to the presence of the bevel 92, the glass element 84 preferably has the shape an inverted partial pyramid (e.g., an inverted pyramidal frustum shape), with a top surface 100 of the glass element 84 forming a base of pyramid and a thickness of the glass element 84 defining the height of the frustum. Thus, the top surface 100 of the glass element 84 has a slightly greater surface area than the bottom surface 86 thereof.

As another example, where the opening in the ceiling is circular, the glass element 84 can have a generally circular shape, in which case the outer edge 90 thereof can be a contiguous circle, and the inclined surface thereof can have a complimentary circular shape. More specifically, where the opening in the ceiling has a circular shape, due to the presence of the bevel 92, the glass element 84 preferably has the shape of an inverted partial cone (e.g., an inverted conical frustum shape), with the top surface 100 of the glass element 84 forming a base of the cone, and the thickness of the glass element 84 defining the height of the frustum.

The opening 14 in the ceiling 12 is preferably defined by an interior peripheral edge 96, which can be formed by a ceiling panel or by a liner therein, for example as discussed below with respect to the use of plaster frames. The outer edge 90 of the top surface 100 of the glass element 84 is preferably in close proximity to the interior peripheral edge 96 of the opening 14 in the ceiling 12 or a liner therein, for example within about 0.05-0.025 inches, around the perimeter of the glass element 84.

The inclined surface 94 of the outer edge 90 of the glass element 84 (for example an exterior thereof) is preferably at least substantially covered by an opaque coating 97 (such as a paint) which is sufficiently thick to substantially prevent light from passing through the inclined surface 94. Preferably, the opaque coating can be white or black in color, however other colors are within the scope of the invention. This configuration prevents an undesirable “halo effect” which can result from light emitted from the lighting element 28 reflecting within the glass element 84 and travelling horizontally through the glass element 84 and exiting horizontally through the outer edge 90. Such reflected light can be up to or about 10 percent of the light incident on the glass element.

The glass element 84 can be mounted to a mounting structure 98 disposed within the opening 14 of the ceiling 12, which is fixed to (and/or fixed relative to) the housing 16. For example, the glass element 84 can be mounted to the mounting structure 98 by an adhesive (not shown) applied to the top surface 100 of the glass element 84, adjacent to and around the periphery of the glass element 84, which adhesive adheres to a peripheral portion of the mounting structure 98.

Referring to FIGS. 11-18, in an embodiment, the lighting fixture 10 preferably has cover assembly including a temporary cover plate 102 and a resilient seal 104 which is removably mounted to a periphery of the cover plate 102. The cover and seal 102, 104 are adapted to removably mount to (or relative to) the lighting fixture 10 after installation. The cover plate 102 is configured to provide protection for the interior of the lighting fixture 10 during construction activity. Preferably, the cover plate 102 is composed of or includes transparent or translucent material such that the light fixture 10 may be used during construction activities with the cover installed.

The cover plate 102 and seal 104 are particularly suitable for use when the lighting fixture 10 includes a plaster frame 106 (a/k/a, a mud ring), which is used when the opening 14 in the ceiling 12 requires finishing (i.e., plastering) after the lighting fixture is installed, for example when the ceiling material is plasterboard (drywall).

The plaster frame 106 includes a liner 108 which is disposed within the opening 14 of the ceiling and closely follows a periphery of the opening 14. The plaster frame 106 also includes a mesh 110 which is attached to and surrounds an exterior of a bottom 112 of the liner 108. In use, the mesh 110 is positioned against and parallel to the bottom 88 of the ceiling 12 and plaster is applied thereover during finishing. The plaster frame 106 can be connected to the housing 16 by fasteners (FIG. 19) directed through a peripheral flange 114 disposed around the bottom of the liner 108, or through the mesh 110.

The seal 104 forms a substantially air-tight seal between the cover plate 102 and the liner 108 which prevents the ingress of plaster or other finishing material between the cover plate 102 and the liner 108 which can occur during finishing if there is a gap (even if small) between the cover and the liner. The seal 104 effectively eliminates any gap between the cover plate 102 and the liner 108.

The cover plate 102 is preferably formed of relatively rigid material, such as rigid plastic. The seal 104 is preferably formed of relatively flexible material, such as an elastomeric material, for example TPE 70 thermoplastic which is relatively heat resistant.

The cover plate 102 can have an upward extending peripheral flange 116 extending around the periphery of the cover plate 102. The seal 104 preferably has a contiguous shape corresponding to the shape of the cover plate 102 and has a downwardly open, rectilinear channel 118 which extends around a periphery of the seal and which is configured to sealingly mount to the peripheral flange 116 of the cover plate 102, around the periphery of the cover plate 102. When an assembly of the cover plate 102 and seal 14 is mounted to the plaster frame 106, an outer peripheral wall 120 of the seal 104 abuts and is compressed against (and is preferably parallel and co-planar with) an interior wall 122 of the bottom 112 of the liner 108. Also, when mounted, the outer peripheral wall 120 of the seal 104 is preferably co-terminus with a bottom of the interior wall 122 of the liner 108 to prevent any substantial finishing material from contacting the interior wall 122. The cover and seal 102, 104 also substantially seal the interior of the light fixture 10 from dust and other potential contaminates during construction activities.

The cover plate 102 preferably mounts to the light fixture 10 in a vertical (e.g., upward) direction and is removed in an opposite (downward) direction. In use, to mount the cover plate 102, the seal 104 can be mounted to the peripheral flange 116 of the cover plate 102 and then the assembly of the cover and seal can be mounted to the plaster frame 106. At this point the ceiling can be finished around the opening 14. After finishing, to remove the cover plate 102, the cover can be removed from the plaster frame 106, leaving the seal 104 mounted to the liner 108 of the plaster frame. Then, the seal 104 can be removed from the liner 108.

The cover plate 102 can include one or more (e.g., 2 or 3) attachment hooks 124 projecting upwardly from a top 126 of the cover plate 102. Each attachment hook 124 is adapted to extend upwardly into the liner 108 and to engage the interior wall 122 of the liner 108, for removably mounting the cover plate 102. Each attachment hook 124 is adapted to resiliently deflect inwardly during mounting to and removal. The cover plate 102 can include a grip 128 disposed in the recessed portion for insertion and removal of the cover. The cover can be removed after installation of the light fixture, from below (i.e., from within the room).

The cover plate 102 and seal 104 described herein are particularly useful for lighting fixtures having flush glass elements with beveled edges as described herein. This is because, in such configurations, after installation, a bottom portion of the interior wall 122 of the liner 108 is exposed and visible due to the beveled edge of the glass element. Thus any finishing material present on the interior wall would be visible and/or would require additional finishing work to remove.

Referring to FIG. 19, the bottom surface 86 of the glass element 84 can be substantially flush with the bottom 112 of a liner 108 of the plaster frame 106, (and/or other collar or structure lining the opening in the ceiling), which provides an aesthetically pleasing appearance to the visible portion of the light fixture after the ceiling is finished. To finish the ceiling, a smooth layer of plaster 130 is applied over the mesh 110 up to, and at the same level as the bottom 112 of the liner 108, in a known manner. After this is completed, the bottom surface 86 of the glass element 84 is preferably substantially planar with the bottom 88 of the finished ceiling, as described above. In addition, the outer edge 90 of the glass element 84 is preferably in close proximity to the interior wall 122 of the liner 130, for example within about 0.05-0.025 inches, around the perimeter of the glass element 84.

While the cover plate 102 and seal 104 have been described as used with a plaster frame 106, it can be appreciated the cover plate 102 and seal 104 can be used with other structures, such as with a collar or other structure permanently connected to the housing.

What is claimed:

1. A recessed light fixture operable to emit light through an opening in a ceiling into a room below the ceiling, the light fixture comprising:

a full or partial enclosure adapted to be disposed within the ceiling;

an aperture in the enclosure;

a light source operable to emit light through the aperture;

a glass element operable to transmit light emitted from the light source into the room, the glass element being configured to be disposed within the opening in the ceiling and to substantially fully span the opening such that substantially all light emitted into the room from the light source passes through the glass element;

the glass element having a top surface and a substantially planar bottom surface and the glass element being operable to be fixed relative to the enclosure, with the bottom surface substantially co-planar with a bottom surface of the ceiling;

the glass element having an outer edge extending around a periphery of the glass element, and the outer edge having a bevel extending around the periphery of the glass element, and the bevel being inclined upwardly and outwardly from the bottom surface of the glass element;

the bevel having an opaque coating substantially covering the bevel and operable to substantially prevent light from exiting through the bevel;

the glass element being supported by a mounting structure fixed relative to the enclosure, by the top surface of the glass element; and the bottom surface of the glass element and the opaque coating being visible portions of the light fixture.

2. The recessed light fixture of claim 1, wherein:

the opening in the ceiling is defined by an interior periphery;

the outer edge of the glass element is configured to be maximally spaced from the interior periphery of the opening in the ceiling a distance not greater than about 0.05-0.025 inches around the periphery of the glass element.

3. The recessed light fixture of claim 1, wherein:

the opening in the ceiling is substantially square; and the glass element has a substantially planar top surface, and has a substantially inverted pyramidal frustum shape.

4. The recessed light fixture of claim 1, wherein:

the opening in the ceiling is substantially circular; and the glass element has a substantially planar top surface, and has a substantially inverted conical frustum shape.

5. A recessed light fixture operable to emit light through an opening in a ceiling into a room below the ceiling, the light fixture comprising:

a full or partial enclosure;

an aperture in the enclosure;

a light engine assembly having a heat sink and a light source mounted to the heat sink, the light source assembly being operable to emit light through the aperture;

a position of the light engine assembly being adjustable relative to the aperture into at least three unique positions including a downlight position, wall wash position and service position;

in the downlight position, the light engine assembly being spaced vertically from the aperture at a first distance and an optical axis of the light source being in a first position which is substantially vertical and passing through a center of the aperture;

in the wall wash position, the light engine assembly being spaced vertically from the aperture at a second distance greater than the first distance, and the optical axis of the light source being in a second position which is substantially vertical and is substantially offset from the first position at a first offset distance; and in the service position, the optical axis of the light source being in a third position which is substantially vertical and is substantially offset from the first position at a second offset distance greater than the first offset distance.

6. A recessed light fixture as in claim 5, wherein:

the light engine assembly is movably mounted to a pair of brackets mounted to the enclosure, each bracket having a pair of guides configured to confine movement of the light engine assembly between the downlight, wall wash and service positions, relative to the guides.

7. A recessed light fixture as in claim 6, wherein:

the light engine assembly has first and second pairs of pins on first and second sides of the light engine assembly and the first and second pins engage the guides of the brackets.

8. A recessed light fixture operable to emit light through an opening in a ceiling into a room below the ceiling, the light fixture comprising:

a full or partial enclosure;

an aperture in the enclosure;

a light source operable to emit light through the aperture;

a plaster frame having a liner configured to be disposed within the opening of the ceiling, the liner having an interior surface defining an opening of the plaster frame and having a bottom edge configured to be substantially co-planar with a bottom surface of the ceiling;

the plaster frame having a mesh disposed around the liner and the mesh being configured to be disposed against the bottom surface of a panel of the ceiling;

a cover assembly adapted to close the opening of the plaster frame, the cover assembly having a cover plate and having an elastomeric seal configured to mount to the cover plate, with the seal being disposed around a periphery of the cover plate;

the cover assembly being configured to removably mount to the plaster frame with the seal abutting the interior wall of the liner within the opening of the ceiling and forming a contiguous seal thereagainst, with an outer peripheral wall of the seal being configured to sealing abut and be compressed against the interior wall of the liner of the plaster frame, the seal extending substantially to the bottom of the interior wall of the liner, and the seal being operable to prevent ingress of finishing material between the cover plate and the liner of the plaster frame;

the cover plate having an upward extending peripheral flange extending around the periphery of the cover plate;

the seal having a downwardly open channel extending around a periphery of the seal and configured to mount to the peripheral flange of the cover plate, around the periphery of the cover plate; and an outer peripheral wall of the seal being configured to sealing abut the interior wall of the liner of the plaster frame.

9. The recessed light fixture of claim 8, wherein:

the cover plate has an attachment hook projecting upwardly from the cover plate within an area defined by the outer peripheral wall of the seal, and the attachment hook is adapted to engage the liner of the plaster frame for removably mounting the cover assembly from within the room.

10. The recessed light fixture of claim 8, wherein:

the cover is formed of relatively rigid plastic and the seal is formed of relatively flexible material.

11. The recessed light fixture of claim 10, wherein:

the seals is formed of TPE 70 thermoplastic.

12. A recessed light fixture operable to emit light through an opening in a ceiling into a room below the ceiling, the light fixture comprising:

a full or partial enclosure;

an aperture in the enclosure;

a light source operable to emit light through the aperture;

a plaster frame having a liner configured to be disposed within the opening of the ceiling, the liner having an interior surface defining an opening of the plaster frame and having a bottom edge configured to be substantially co-planar with a bottom surface of the ceiling;

the plaster frame having a mesh disposed around the liner and the mesh being configured to be disposed against the bottom surface of a panel of the ceiling;

a cover assembly adapted to close the opening of the plaster frame, the cover assembly having a cover plate and having an elastomeric seal configured to mount to the cover plate, with the seal being disposed around a periphery of the cover plate;

the cover assembly being configured to removably mount to the plaster frame with the seal abutting the interior wall of the liner within the opening of the ceiling and forming a contiguous seal thereagainst, with an outer peripheral wall of the seal being configured to sealing abut and be compressed against the interior wall of the liner of the plaster frame, the seal extending substantially to the bottom of the interior wall of the liner, and the seal being operable to prevent ingress of finishing material between the cover plate and the liner of the plaster frame;

the cover plate has an upwardly extending peripheral flange extending around the periphery of the cover plate;

the seal is configured to removably mount to the peripheral flange of the cover plate; and an outer peripheral wall of the seal being configured to sealing abut the interior wall of the liner of the plaster frame.

13. The recessed light fixture of claim 12, wherein:

the cover plate has an attachment hook projecting upwardly from the cover plate within an area defined by the outer peripheral wall of the seal, and the attachment hook is adapted to engage the liner of the plaster frame for removably mounting the cover assembly from within the room.

14. The recessed light fixture of claim 12, wherein:

upon mounting the cover plate assembly to the plaster frame, the cover plate being operable to be removed from the plaster frame, and upon such removal the cover plate being operable to release from the seal, leaving the seal mounted to plaster frame.

* * * * *